United States Patent
Sakurai et al.

[19]

[11] Patent Number: 6,132,003
[45] Date of Patent: Oct. 17, 2000

[54] SEAT BACK FRAME

[75] Inventors: Akihiro Sakurai; Akihiko Mizoo; Ryozo Mizuno, all of Hamamatsu, Japan

[73] Assignee: Suzuki Motor Corp., Hamamatsu, Japan

[21] Appl. No.: 09/503,995

[22] Filed: Feb. 14, 2000

Related U.S. Application Data

[63] Continuation of application No. 09/010,336, Jan. 21, 1998, Pat. No. 6,048,033.

[30] Foreign Application Priority Data

Jan. 21, 1997 [JP] Japan ..................................... 9-008238

[51] Int. Cl.[7] ................................................. A47C 7/02
[52] U.S. Cl. .................................. 297/452.18; 297/361.1
[58] Field of Search .......................... 297/452.18, 361.1, 297/410, 452.52, 463.2, 452.2

[56] References Cited

U.S. PATENT DOCUMENTS

| | | |
|---|---|---|
| 3,971,587 | 7/1976 | Curtis et al. . |
| 4,544,204 | 10/1985 | Schmale . |
| 4,695,097 | 9/1987 | Muraishi . |
| 5,044,693 | 9/1991 | Yokota . |
| 5,123,706 | 6/1992 | Granzow et al. . |
| 5,129,707 | 7/1992 | Yamauchi . |
| 5,131,721 | 7/1992 | Okamoto . |
| 5,328,248 | 7/1994 | Nishiyama . |
| 5,547,259 | 8/1996 | Fredrick . |
| 5,636,901 | 6/1997 | Grilliot et al. . |
| 5,697,670 | 12/1997 | Husted et al. . |

FOREIGN PATENT DOCUMENTS

| | | |
|---|---|---|
| 57-1807 | 1/1982 | Japan . |
| 58-15542 | 1/1983 | Japan . |
| 62-44693 | 11/1987 | Japan . |
| 2-3328 | 1/1990 | Japan . |
| 5-37807 | 9/1993 | Japan . |
| 2510289 | 6/1996 | Japan . |

*Primary Examiner*—Milton Nelson, Jr.
*Attorney, Agent, or Firm*—Alston & Bird LLP

[57] ABSTRACT

There is provided a seat back frame in which the same frame can be used for both of single reclining and double reclining, and the deformation of side frame can be controlled against a backward load. The seat back frame is composed of bilaterally symmetrical side frames, an upper pipe welded to both upper end portions of the side frames, and a lower pipe welded to the lower portions of the side frames. The side frames have a wider-in-front shape such that the width is greater on the front side than on the rear side. On the face of the side frame, triangular planes are provided so as to be vertically adjacent to each other, and the common side of the adjacent triangles is bent.

2 Claims, 10 Drawing Sheets

SEAT BACK FRAME

This application is a continuation of U.S. application Ser. No. 09/010,336, filed Jan. 21, 1998, now U.S. Pat. No. 6,048,033 which is incorporated herein by reference in its entirety.

FIELD OF THE INVENTION AND RELATED ART STATEMENT

The present invention relates to an automotive seat and, more particularly, to a construction of a seat back frame.

To tilt back a seat back for an automotive seat, a reclining device is provided at the side of a connecting portion between a seat and its seat back. The reclining device is available in two types: a double reclining system in which the reclining devices are provided on both sides of the seat and a single reclining system in which the reclining device is provided only on one side of the seat.

Figure 16:
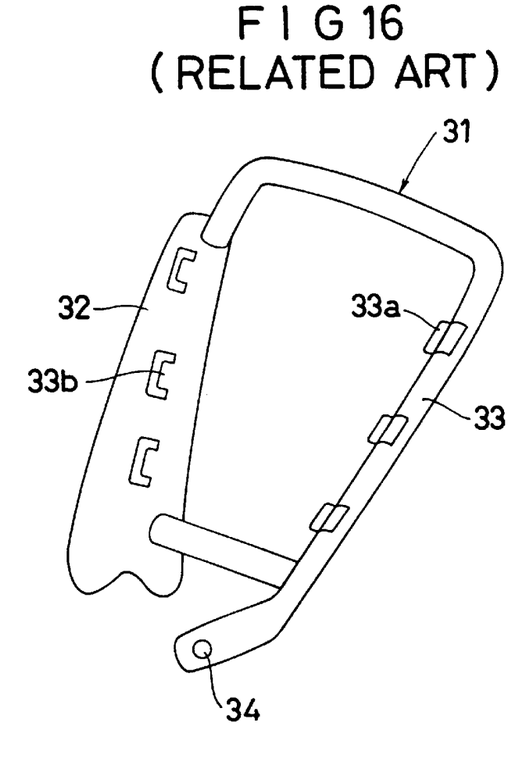
FIG. 16 is a perspective view of a conventional seat back frame.

Therefore, the frame shape of seat backs differs between the double reclining system and the single reclining system depending on whether or not the reclining device installation portions are present on the opposite sides of the seat. More specifically, the double reclining seat back frame has basically the same shape on the right and left sides because the reclining device installation portions are present on both sides. As shown in FIG. 16, for the single reclining seat back frame 31, one side frame is provided with a reclining device installation bracket 32, and the other side frame 33 is merely provided with a free hinge hole 34 at the end thereof. In FIG. 16, reference numeral 33a denotes a retainer welded to the side frame 33, and 33b denotes a hook provided on the installation bracket 32.

Figure 17:
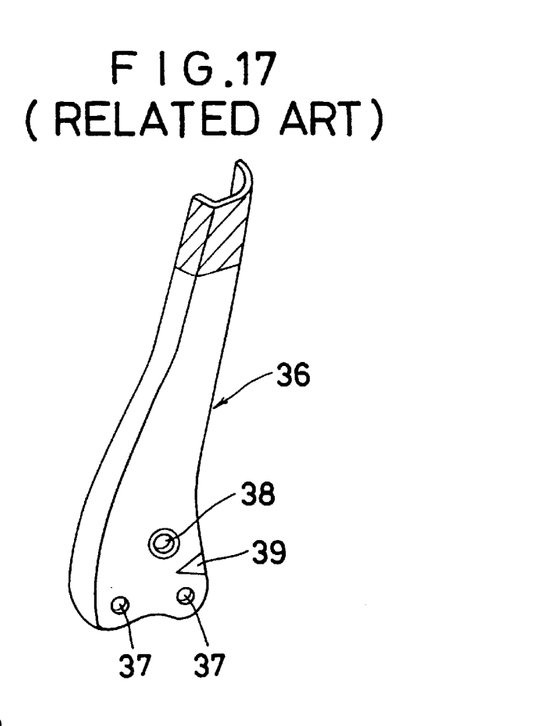
FIG. 17 is a perspective view of a side frame for a conventional seat back frame.

FIG. 17 shows a side frame 36 for a double reclining seat back frame. As shown in the figure, the side frame 36 is provided with a bead 39 for absorbing a load at an arbitrary place between an installation hole 37 for the reclining device installation bracket and a lower pipe 38. For example, when an external force is applied to a passenger sitting on the seat and thereby a backward load is applied to the seat back frame, the frame is deformed plastically at the portion of the bead 39, whereby the load applied to the reclining device is controlled.

Figure 18:
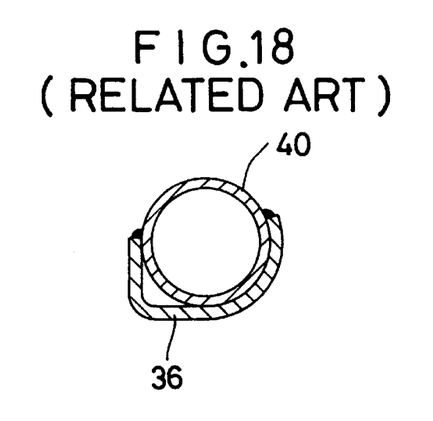
FIG. 18 is a sectional view showing a fixing portion of a side frame and an upper pipe for a conventional seat back frame.

Also, for the side frame 36 shown in FIG. 17, when an upper pipe 40 is fixed as shown in FIG. 18, the hatched portion shown in FIG. 17 is sometimes cut to adjust the height of seat back frame. In such a case, in order to fix the upper pipe 40 to the side frame 36, the upper end shape of the side frame 36 must coincide with the outer periphery of the upper pipe 40. For this purpose, the upper end portion of the side frame 36 must have the same shape for a certain length.

As described above, since the shape of seat back frame differs between the double reclining system and the single reclining system, the seat back frames of two systems must be manufactured separately, resulting in poor production efficiency.

As described above, the double reclining seat back frame is provided with a bead on the right and left side frames to absorb load energy by the plastic deformation of side frames at the bead portion.

However, although the side frame is deformed under a predetermined load, the time for which the deformation of the side frame can be controlled is very short because the side frame is bent at the small bead portion. Also, because the frame faces of the right and left side frames are parallel to the longitudinal direction of vehicle body, when the bead is crushed and then the deformation of frame further proceeds, there is no knowing to which direction of right and left the side frame falls, and the strength balance of side frame and upper pipe is destroyed, so that the upper pipe is sometimes deformed. Because the portion at which the bead is formed lies between the lower pipe and the installation hole for reclining device, if a frame torsion occurs after the bead is crushed, there is a possibility that the reclining device is deformed.

For the single reclining seat back frame, the same bead cannot be formed on the right and left side frames because the shapes of the right and left side frames are different.

Moreover, since the side on which the reclining device installation bracket is provided has a high strength, the side frame on the free hinge side is sometimes distorted when a backward load is applied to the seat back frame.

OBJECT AND SUMMARY OF THE INVENTION

The object of the present invention is to solve the above problems, and accordingly an object thereof is to provide a seat back frame in which the same frame can be used for both of single reclining and double reclining, the right and left side frames have the equal strength, and the deformation of side frame can be controlled.

To achieve the above object, a first aspect of the present invention provides a seat back frame in which a reclining installation portion is provided on right and left side frames of a seat back for an automotive seat and an upper frame connecting the upper ends of the right and left side frames and a lower frame connecting the lower ends thereof are provided, characterized in that a reclining device is fitted at only one of the reclining installation portions on the right and left side frames, and the other reclining installation portion thereof is fitted with a free hinge metal with which a single reclining seat is supported by a frame for double reclining seat.

Also, a second aspect of the present invention provides a seat back frame in which a reclining installation portion is provided on right and left side frames of a seat back for an automotive seat and an upper frame connecting the upper ends of the right and left side frames and a lower frame connecting the lower ends thereof are provided, characterized in that a face of each of the respective right and left side frames includes a portion defined by at least two triangular planes in which two sides of each of the triangular planes extend from one edge of the side frame face to the other edge thereof and the remaining one side forms a portion of one of the edges of the respective side frame face, and a bent plane is formed by combining the triangular planes so as to be vertically adjacent to each other and joined at a boundary line therebetween, by which the right and left side frames are deformed at the boundary line of the triangular planes by a backward load applied to the seat back.

Also, a third aspect of the present invention provides a seat back frame in which a reclining installation portion is provided on right and left side frames of a seat back for an automotive seat and an upper frame connecting the upper ends of the right and left side frames and a lower frame connecting the lower ends thereof are provided, characterized in that a reclining device is fitted to only one of the reclining installation portions on the right and left side frames, and the other reclining installation portion thereof comprises a free hinge portion, the right and left side frames are shaped so as to be wider in front, a face of each side frame includes a portion defined by at least two triangular planes in which two sides of each of the triangular planes extend from one edge of the side frame face to the other edge thereof and the remaining one side forms a portion of one of the edges of the side frame face, a bent plane is formed by combining the triangular planes so as to be vertically adjacent to each other, the bending of the bent plane is alternate, the ends of the lower frame are fixed to the right and left side frames at a position between the triangular planes and the reclining installation portion, the respective right and left side frames are provided with a curved portion with the same shape as or a shape complementary to that of the outer periphery of the upper frame fixed to the upper portions of the right and left side frames, and an L-shaped hook is provided at the side of the respective right and left side frames.

DETAILED DESCRIPTION OF PREFERRED EMBODIMENTS

A seat back frame in accordance with an embodiment of the present invention will be described with reference to the accompanying drawings.

Figure 1:
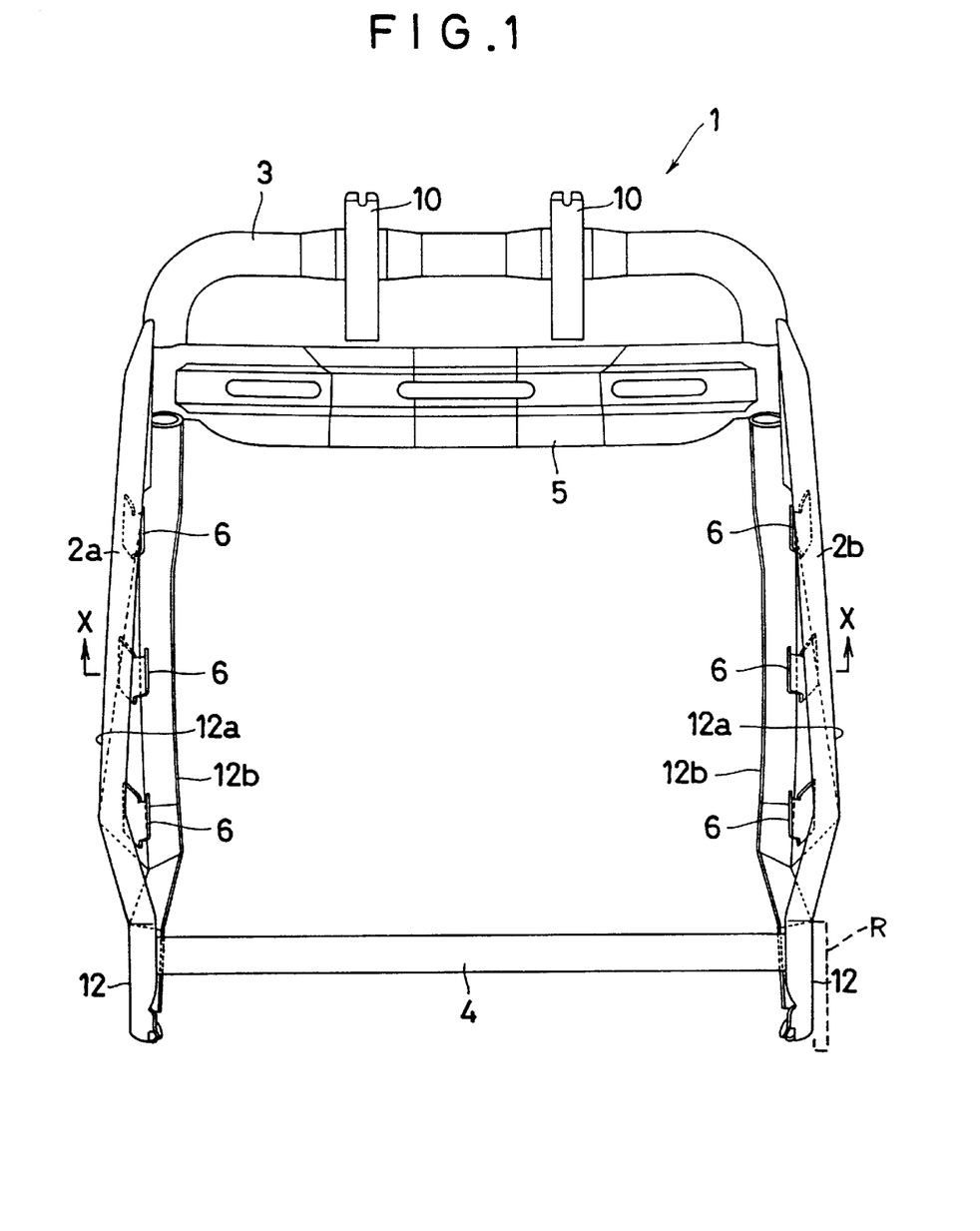
FIG. 1 is a front view of a seat back frame in accordance with an embodiment of the present invention.
Figure 2:
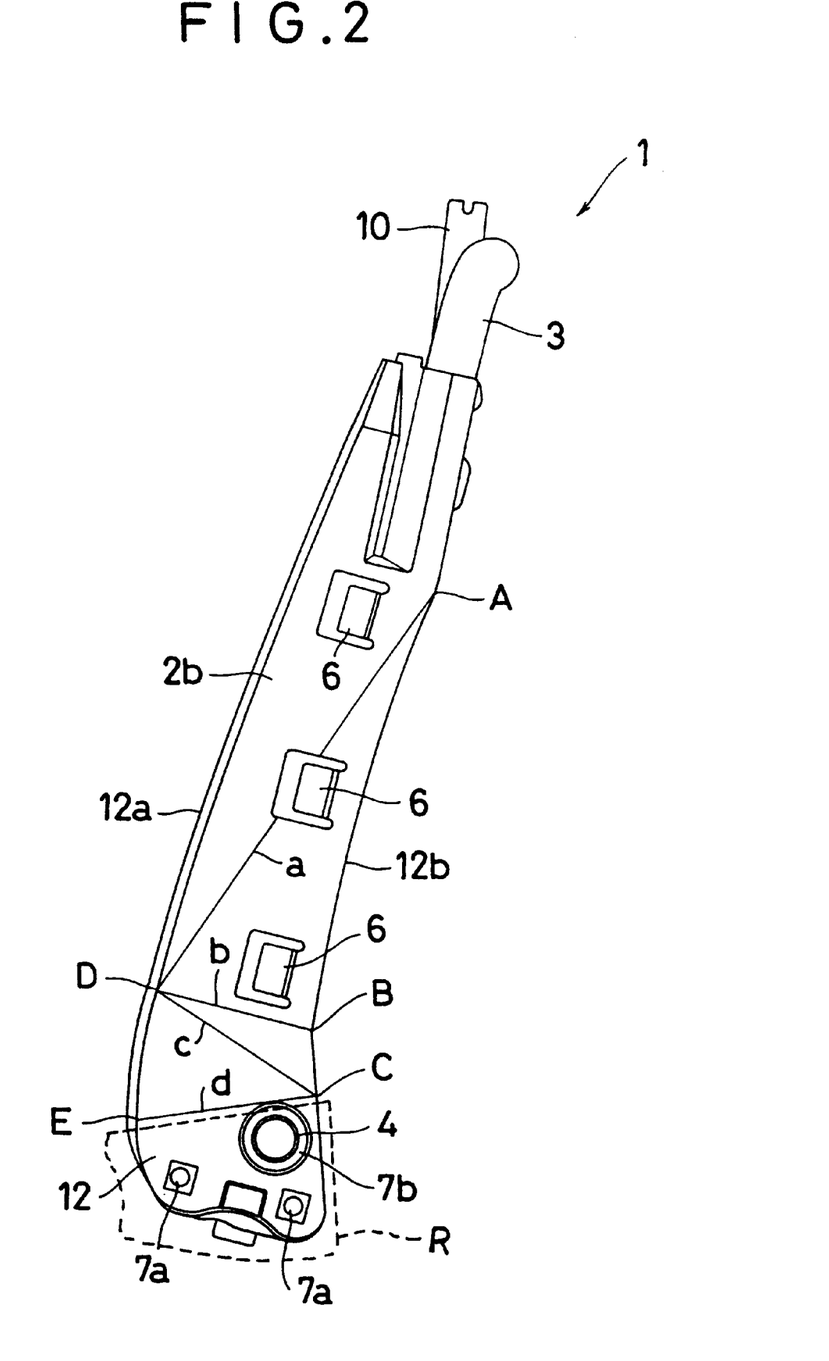
FIG. 2 is a side view of a seat back frame in accordance with an embodiment of the present invention.

FIGS. 1 and 2 show a seat back frame 1 in accordance with the present invention. This seat back frame 1 is mainly composed of bilaterally symmetrical side frames 2a and 2b, an upper pipe 3 formed as a U-shaped upper frame welded to both upper end portions of the side frames 2a and 2b, a lower pipe 4 formed as a lower frame welded to the lower portions of the side frames 2a and 2b, and a back plate 5 welded at the lower part of the upper pipe 3.

Figure 3:
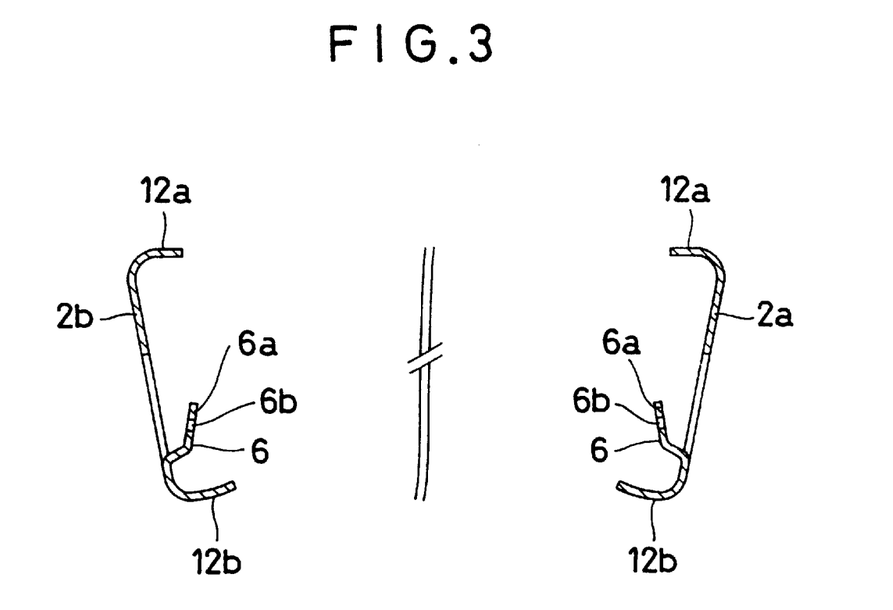
FIG. 3 is a sectional view taken along the line X—X of FIG. 1.

The side frame 2a, 2b is formed of a plate of a U shape in cross section. As shown in FIG. 2, a line connecting AB to BC at a height positioned at the lap of a passenger is formed curvedly, and two reclining device installation bolt holes 7a are formed at the lower end portion. The reclining device R is provided along the side frame 2a, 2b. A conventional type of reclining device can be used, so that the explanation of construction thereof is omitted. As shown in FIG. 3, the side frames 2a and 2b are shaped wider in front so that the front side 12a is wider than the rear side 12b, that is, the transverse distance between side framses 2a and 2b is greater at the front side 12a than at the rear side 12b. As shown in FIG. 2, the face of the side frame 2a, 2b is provided with triangular planes indicated by triangles ADB, BCD, and CDE adjoining in the vertical direction of the side frame 2a, 2b. Each of these triangular planes has two sides using two out of the sides a to d extending from the front side 12a to the rear side 12b of the side frame 2a, 2b and one side on the front side or rear side of the side frame 2a, 2b.

Figure 4:
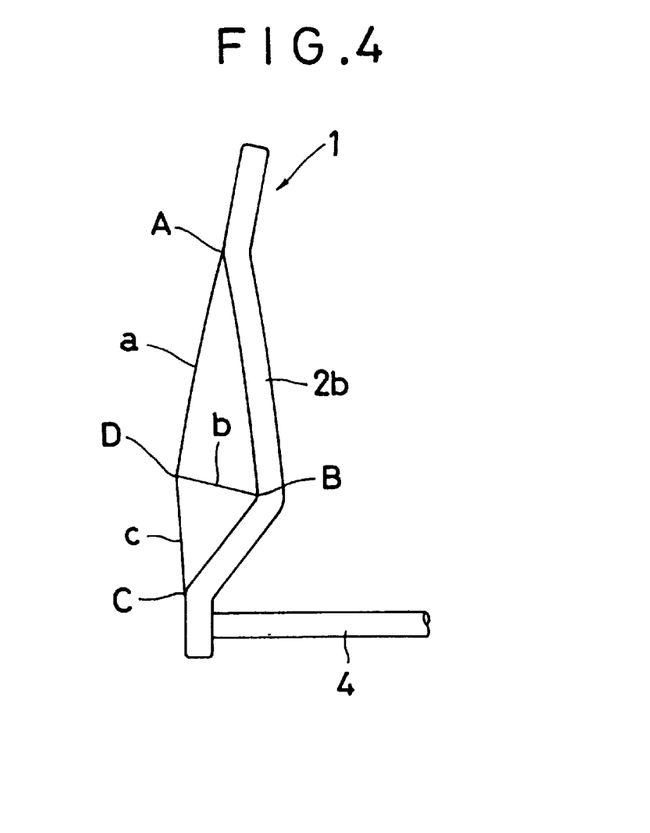
FIG. 4 is a schematic back view of a side frame for a seat back frame in accordance with an embodiment of the present invention.

These triangular planes do not lie on the same plane. As shown in FIG. 4, a great bent portion is formed on the common side b of the triangles ADB and BCD, and a bent portion is formed on the common side c of the triangles CBD and CDE. Also, bent portions are formed on the side a of the triangle ADB and on the side d of the triangle CDE.

Figure 5:
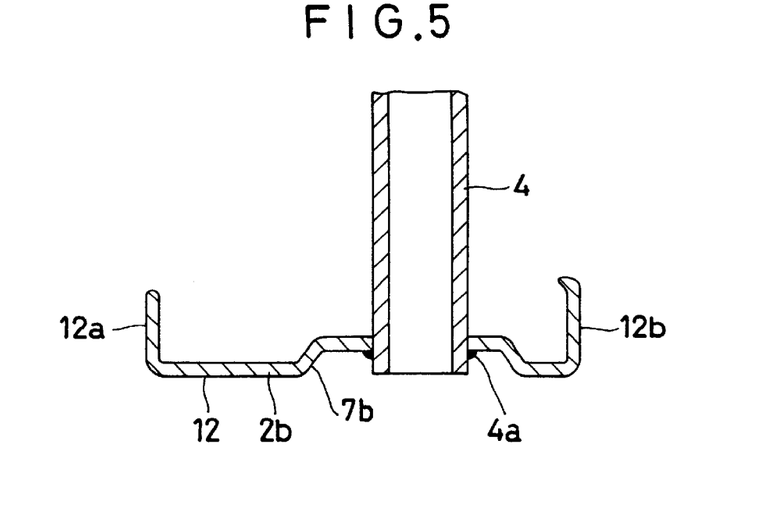
FIG. 5 is an enlarged sectional view showing a fixing portion of a side frame and a lower pipe for a seat back frame in accordance with an embodiment of the present invention.

As shown in FIGS. 2 and 3, the side frames 2a and 2b are formed integrally with three sets of L-shaped hooks 6. These hooks 6 are formed at the same intervals vertically with the same width, and a retaining hole 6b is formed in an attaching piece 6a. As shown in FIG. 5, at the lower part of the side frame 2a, 2b is provided a circular step portion 7b, to which the lower pipe 4 is welded on the outer side. As shown in FIG. 2, the step portion 7b is located between the reclining device installation bolt holes 7a and the side d of the triangle CDE. As shown in FIG. 5, the end of the lower pipe 4 slightly protrudes from the step portion 7b, but does not protrude from the reclining device installation planes 12.

The reclining device installation planes 12 at the lower parts of the side frames 2a and 2b are not arranged so as to be wider in front but in parallel to each other as shown in FIGS. 1 and 5.

Figure 6:
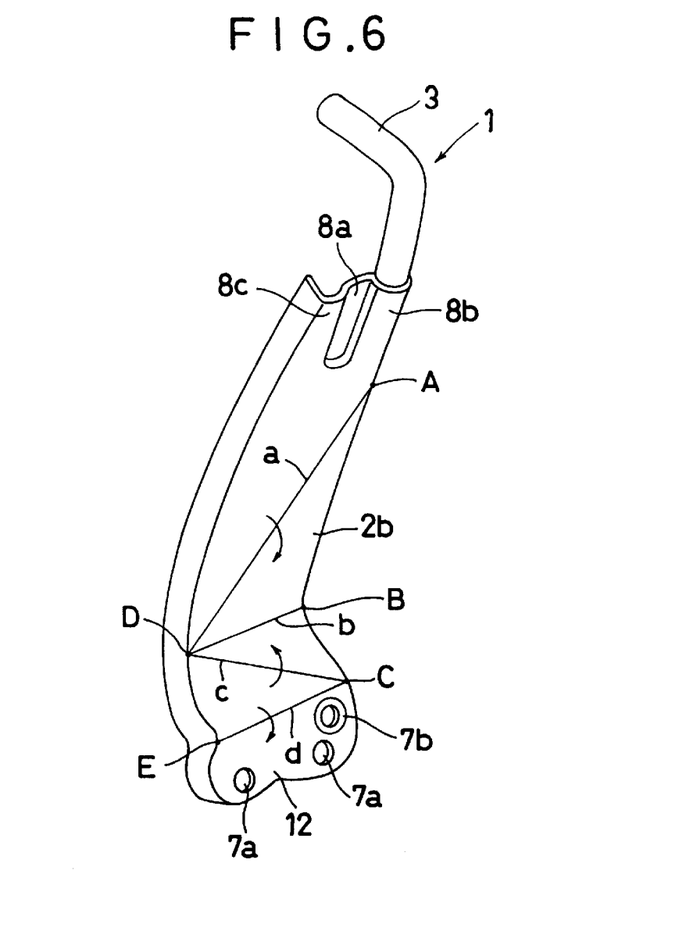
FIG. 6 is a perspective view of a side frame for a seat back frame in accordance with an embodiment of the present invention.
Figure 7:
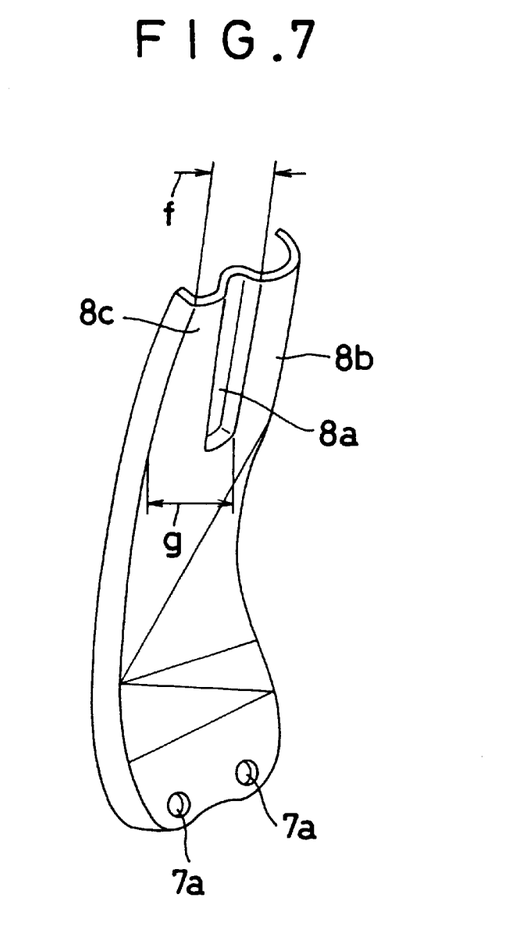
FIG. 7 is a perspective view for illustrating a construction of side frame upper end portion for a seat back frame in accordance with an embodiment of the present invention.
Figure 8:
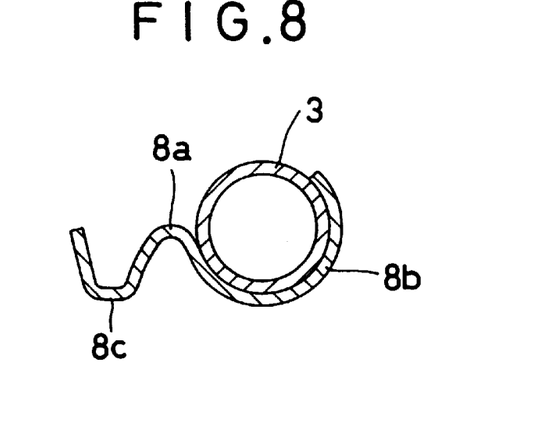
FIG. 8 is an enlarged sectional view showing a fixing portion of a side frame and an upper pipe for a seat back frame in accordance with an embodiment of the present invention.

As shown in FIG. 6, the end portions of the upper pipe 3 are welded to the upper end portions of the side frames 2a and 2b. At this fixing portion, as shown in FIGS. 7 and 8, a recess 8a is formed at the upper part of the side frame 2a, 2b, a vertically long, curved joint portion 8b is provided at the rear of the recess 8a, and a non-joint portion 8c is provided at the front. The diameter of the joint portion 8b is equal to the outside diameter of the upper pipe 3. For the non-joint portion 8c, the width g at the lower part is larger than the width f at the upper end.

As shown in FIG. 1, a pair of headrest attachment pieces 10 are provided at the upper part of the upper pipe 3, and a back plate 5 is welded to both the lower end portions of the upper pipe 3.

The following is a description of the operation and effects of the seat back frame.

In this embodiment, since both of the side frames 2a and 2b of the seat back frame 1 can be fitted with a reclining device, this seat back frame can be used for a double reclining seat. Also, by installing a reclining device to only one side of the seat back frame 1 and by making the other side a free hinge, the seat back frame can be used as a single reclining seat. Thereupon, the same seat back frame 1 can be used for both of single reclining seat and double reclining seat. Therefore, the seat back frame of the same shape can be produced in large quantities, resulting in a decrease in production cost.

Since a great bend portion is formed by the triangular planes ABD and BCD as shown in FIG. 2 and the side frames 2a and 2b are arranged so as to be wider in front, the bent portion and tilting direction of the side frame can be restricted when a backward load is applied to the seat back frame 1.

That is, when the side frame 2a, 2b is bent, the triangular planes ABD, BCD, and CDE are bent on the common sides b and c, and the areas of the triangular planes ABD, BCD, and CDE are large. Therefore, the range of time for which the load input can be controlled is widened, a heavy load can be received for a long time, and no sudden moment change occurs during deformation.

In FIG. 6, the direction in which the side frame 2a, 2b is bent is indicated by arrows. As shown in the figure, the side frame 2a, 2b is bent in the arrow-marked direction on the sides a, c, and d of the triangles, and the side b is bent to the inner side of the side frame 2a, 2b. Therefore, the seat back frame 1 is deformed backward. By this load control, the upper pipe 3 and the side frame 2a, 2b are balanced in terms of strength, so that the torsion of the upper pipe 3 can be decreased.

Thus, when the side frame 2a, 2b is deformed by a load, the deformation takes place at the upper part above the side d of the triangular plane CDE. Therefore, on the reclining device installation plane 12, a deformation does not occur, so that the reclining device is not affected by the load.

Figure 9:
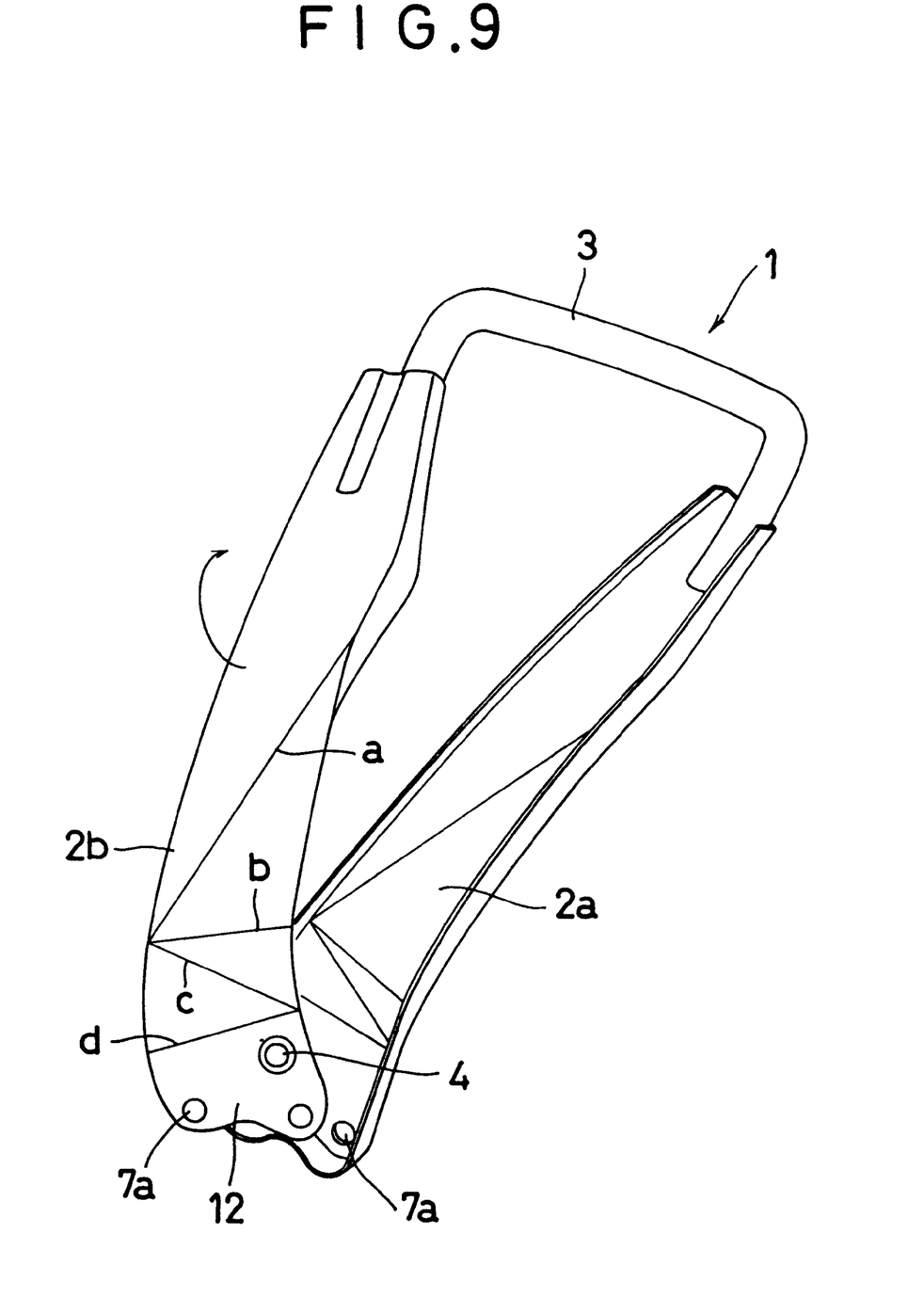
FIG. 9 is a perspective view showing a deformed state when a torsional load is applied to a seat back frame in accordance with an embodiment of the present invention.

FIG. 9 shows a deformed state of the seat back frame 1 in which the side frame 2a is the free hinge side and the side frame 2b is fitted with a reclining device so as to be used for a single reclining seat. As shown in the figure, when the side frame 2b on the reclining device installation side is subjected to a torsion indicated by arrow by a load such that the free hinge side of the side frame 2a is twisted, the deformation of the side frame 2b is started by the bending of the side a of the side frame 2b. In this case as well, the deformation takes place at the portion above the side d, so that the influence of torsion on the free hinge side is less liable to be transmitted to the reclining device installation plane 12.

In the case where the seat back height is adjusted when the upper pipe 3 is installed to the side frames 2a and 2b of the seat back frame 1, the upper end portions of the side frames 2a and 2b are cut. In such a case, since a vertically long joint portion 8b is provided as shown in FIG. 7, the width f at the upper end and the width g at the lower part need not be a fixed width. Therefore, the degree of freedom in designing increases, and also the strength can be increased.

Figure 10:
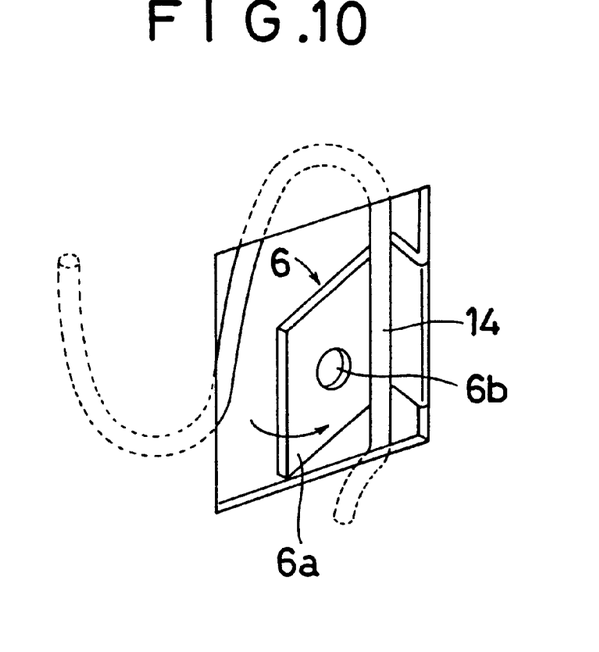
FIG. 10 is a perspective view showing a fixing portion of a hook formed on a side frame and an S spring for a seat back frame in accordance with an embodiment of the present invention.

FIGS. 10 to 13 show the hook 6 of the side frame 2b. As shown in FIG. 10, by forming the hook 6 integrally, the hook 6 can be used as a hook for an S spring 14. When the seat back frame is used for a single reclining seat, the need for a conventional retainer, which is installed subsequently, is eliminated. The hook 6 is fixed by further crimping in the arrow-marked direction from the state shown in FIG. 10.

Figure 11:
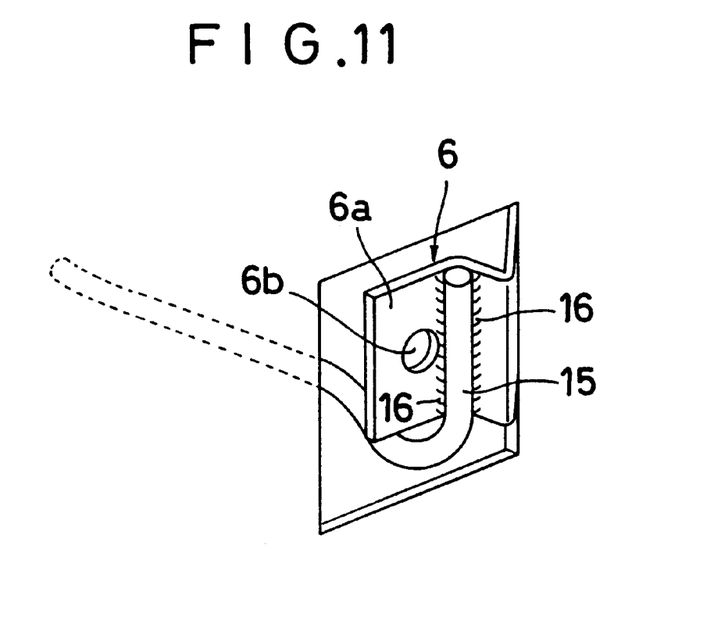
FIG. 11 is a perspective view showing a fixing portion of a hook formed on a side frame and a full mold wire for a seat back frame in accordance with an embodiment of the present invention.
Figure 12:
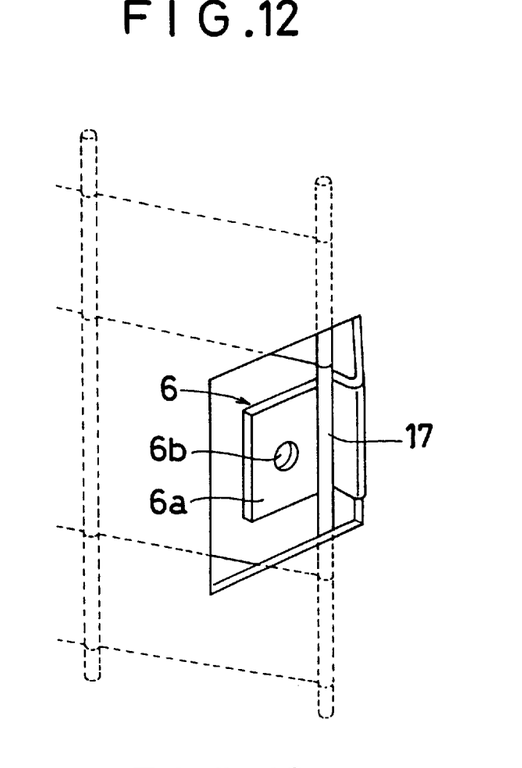
FIG. 12 is a perspective view showing a fixing portion of a hook formed on a side frame and a contour mat for a seat back frame in accordance with an embodiment of the present invention.
Figure 13:
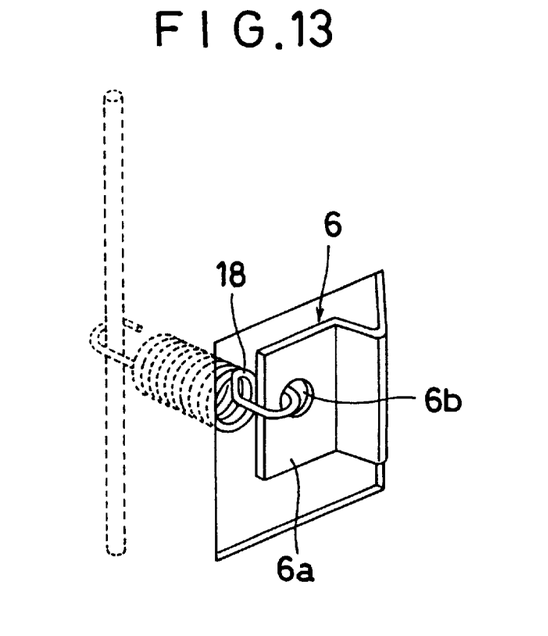
FIG. 13 is a perspective view showing a fixing portion of a hook formed on a side frame and a coil spring for contour mat for a seat back frame in accordance with an embodiment of the present invention.

Also, as shown in FIG. 11, by forming the attaching piece 6a slightly larger for the S spring, a thick full mold wire 15 can be attached in the same frame at a portion where a weld 16 portion does not affect the frame strength. Besides, as shown in FIG. 12, a mat 17 can also be attached by crimping the attaching piece 6a. Also, since the attaching piece 6a is formed with the retaining hole 6b, a coil spring 18 for mat can be attached.

Figure 14:
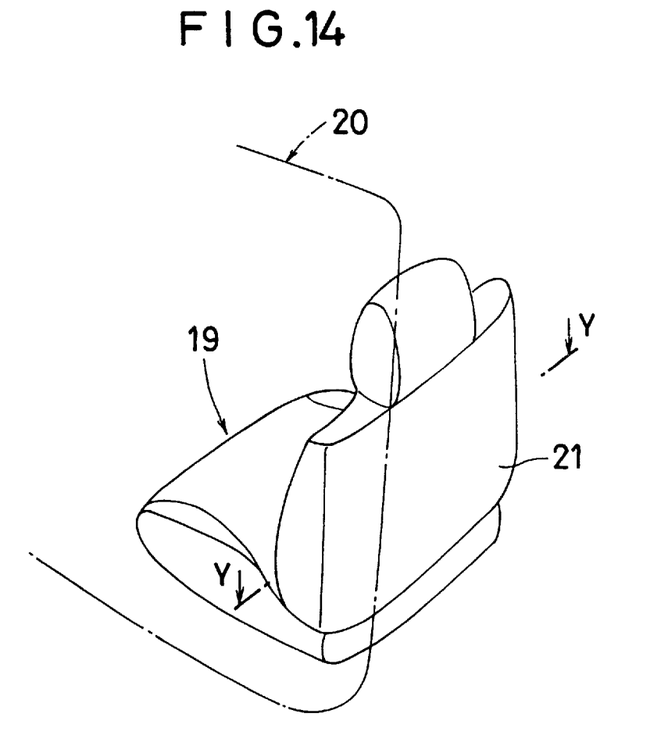
FIG. 14 is a perspective view showing a seat using a seat back frame in accordance with an embodiment of the present invention.

As shown in FIG. 14, when a passenger sits on a rear seat on a two-door car, he/she enters the cabin through an entrance 20 at the side of a front seat 19 by tilting a seat back 21 forward.

Figure 15:
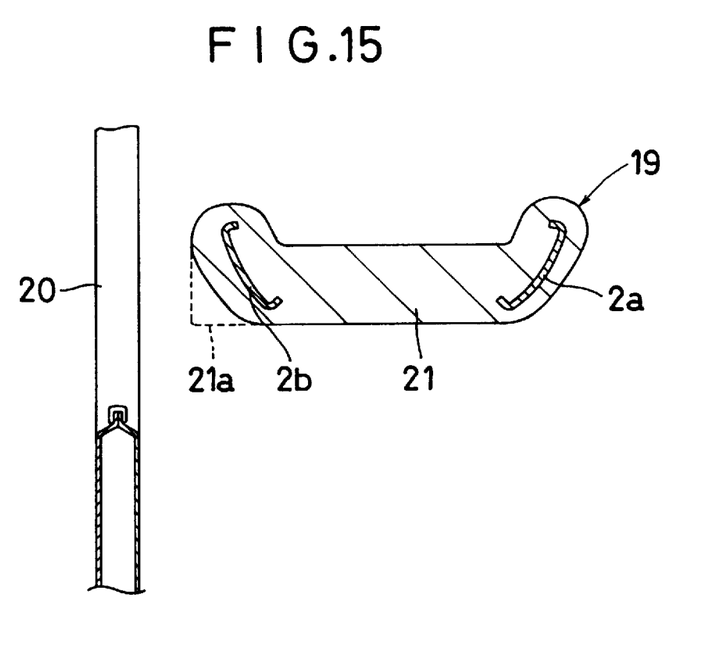
FIG. 15 is a sectional view taken along the line Y—Y of FIG. 14.

In this embodiment, as shown in FIG. 1, the side frames 2a and 2b are arranged so that the front side 12a is wider and the rear side 12b is narrower than the reclining device installation plane 12 of the seat back frame 1. Therefore, as shown in FIG. 15, a corner portion 21a indicated by a broken line at the rear side portion of the seat back 21 is eliminated, so that the passenger can get on and off the car easily.

Also, if the side frame planes of the automotive seat back frame are in parallel in the longitudinal direction of the vehicle body and the seat width is narrow, the passenger's body comes close to the front side of the side frame, so that the passenger has a feeling of physical disorder. Since the side frames 2a and 2b are arranged so as to be wider in front as shown in FIG. 15, the shape of seat back urethane mounted to the side frames 2a and 2b is fitted to this form, providing a shape along the back of human body. When the passenger sits on the seat, the seat back urethane fits to the human body, by which the riding quality can be upgraded.

Since as shown in FIG. 2, the seat back frame 1 is curved by curving the line of AB-BC on the rear side of the side frame 2a, 2b, the leg room for the passenger sitting on the rear seat can be enlarged. The curved shape of the seat back frame 1 serves as if a side support wire is attached even if a side support wire is not disposed in the seat back 21.

As shown in FIG. 5, the step portion 7b is provided on the installation plane 12 of the side frame 2a, 2b, and welding is done so that the welding portion of the lower pipe 4 and the side frame 2a, 2b is drawn in. Thereby, the plane rigidity around the welding portion 4a of the lower pipe 4 is increased, and the crushing of the lower pipe 4 when a load is applied is relaxed.

The above is a description of one embodiment of the present invention. Needless to say, the present invention is not limited to this embodiment, and various modifications can be made on the basis of the technical concept of the present invention.

As described above, according to the first aspect of the present invention, the same seat back frame can be used for both of single reclining and double reclining. Therefore, the same seat back frame can be produced in large quantities, resulting in a decrease in production cost.

Also, according to the second aspect of the present invention, since the bent portion is formed on the triangular plane, the bent portion and tilting direction of the side frame can be restricted when a backward load is applied to the seat back frame. Also, the range of time for which the load input can be controlled is widened, a heavy load can be received for a long time, and no sudden moment change occurs during deformation.

Further, according to the third aspect of the present invention, both the effects of the first and second means can be achieved.

What is claimed is:

1. A seat back frame for a seat back of an automotive seat, comprising:

right and left side symmetrical frames each including a reclining installation portion adapted for attaching a reclining device to the respective side frame and each of said reclining installation portions being capable of mounting a free hinge instead of the reclining device;

a u-shaped upper frame fixedly welded to the upper ends of said right and left side frames;

a lower frame fixedly welded to the lower ends of said right and left side frames at respective locations adjacent said reclining installation portions of said right and left side frames;

a back plate fixedly welded to a lower portion of the u-shaped upper frame;

whereby a reclining device can be fitted to the reclining installation portion of one or both of the right and left side frames so that the seat back frame is adapted to support a single or double reclining seat.

2. A seat back frame according to claim 1, wherein an L-shaped hook is integrally formed from a partially cut out and bent portion of a side of each of said right and left side frames each said hook comprising a tip portion directed towards a front side of the respective side frame, said top portion further being inclined away from the respective side frame towards an interior portion of said frame.

* * * * *